(12) United States Patent
Kindl et al.

(10) Patent No.: US 10,563,571 B2
(45) Date of Patent: Feb. 18, 2020

(54) SYSTEMS AND METHOD FOR CHARGE AIR COOLER DE-ICING

(71) Applicant: Ford Global Technologies, LLC, Dearborn, MI (US)

(72) Inventors: Helmut Kindl, Aachen (DE); Vanco Smiljanovski, Bedburg (DE); Hanno Friederichs, Aachen (DE); Joerg Kemmerling, Monschau (DE); Franz Arnd Sommerhoff, Aachen (DE); Andreas Kuske, Geulle (NL); Christian Vigild, Aldenhoven (DE)

(73) Assignee: Ford Global Technologies, LLC, Dearborn, MI (US)

( * ) Notice: Subject to any disclaimer, the term of this patent is extended or adjusted under 35 U.S.C. 154(b) by 109 days.

(21) Appl. No.: 15/872,519

(22) Filed: Jan. 16, 2018

(65) Prior Publication Data
US 2018/0202349 A1    Jul. 19, 2018

(30) Foreign Application Priority Data
Jan. 19, 2017    (DE) .......................... 10 2017 200 800

(51) Int. Cl.
*F02B 29/04*    (2006.01)
*F02B 33/40*    (2006.01)
(Continued)

(52) U.S. Cl.
CPC ...... *F02B 29/0475* (2013.01); *F02B 29/0468* (2013.01); *F02B 33/40* (2013.01); *F02B 37/10* (2013.01); *F02B 39/10* (2013.01); *F02D 41/0007* (2013.01); *F02D 41/0077* (2013.01); *F02D 41/042* (2013.01);
(Continued)

(58) Field of Classification Search
CPC ............... F02D 41/042; F02D 41/0002; F02D 41/0007; F02D 41/10; F02B 37/04; F02B 37/14; F02B 37/16; F02B 37/18; F02B 39/10; Y02T 10/144; Y02T 10/42
See application file for complete search history.

(56) References Cited

U.S. PATENT DOCUMENTS 6,688,104 B2 * 2/2004 Baeuerle ............. F02D 13/0261
                                            123/198 D
7,213,396 B2 * 5/2007 Ries-Mueller .......... F02B 37/04
                                            60/274
(Continued)

FOREIGN PATENT DOCUMENTS

DE         1025640 B     3/1958
DE    102014211804 A1 * 12/2015 ................ F01P 1/06
(Continued)

OTHER PUBLICATIONS

DE 102014211804 Egermann (English Translation), Published 2015.*

*Primary Examiner* — Jason D Shanske
*Assistant Examiner* — Jessica L Kebea
(74) *Attorney, Agent, or Firm* — Geoffrey Brumbaugh; McCoy Russell LLP

(57) ABSTRACT

Methods and systems are provided for de-icing a charge-air cooler of a boosted engine system when the engine is turned off. In one example, a method may include recirculating air through a bypass passage including an activated electric supercharger and the CAC. The air is warmed by compression and thaws ice accumulated in the CAC.

17 Claims, 3 Drawing Sheets

(51) Int. Cl.
  *F02B 37/10* (2006.01)
  *F02B 39/10* (2006.01)
  *F02D 41/00* (2006.01)
  *F02M 35/10* (2006.01)
  *F02D 41/04* (2006.01)

(52) U.S. Cl.
  CPC .. *F02M 35/1038* (2013.01); *F02M 35/10163* (2013.01); *F02D 41/005* (2013.01); *F02D 2200/0414* (2013.01); *F02D 2200/503* (2013.01); *Y02T 10/144* (2013.01); *Y02T 10/146* (2013.01)

(56) References Cited

U.S. PATENT DOCUMENTS

| | | |
|---|---|---|
| 8,205,447 B2 | 6/2012 | Wolf |
| 8,511,260 B2 | 8/2013 | Kardos et al. |
| 9,109,505 B2 | 8/2015 | Ulrey et al. |
| 9,115,658 B2 | 8/2015 | Glugla et al. |
| 9,267,423 B2 | 2/2016 | Russ et al. |
| 9,347,513 B2 | 5/2016 | Wu et al. |
| 9,682,685 B2 | 6/2017 | Ulrey et al. |
| 2012/0269653 A1* | 10/2012 | Lutoslawski ......... B60K 25/02 417/44.1 |
| 2013/0174544 A1* | 7/2013 | Valetutti ................... F02G 5/02 60/598 |
| 2014/0102424 A1* | 4/2014 | Norman ............. F02B 29/0468 123/542 |
| 2014/0208745 A1* | 7/2014 | Suhocki .................. F02B 37/04 60/611 |
| 2015/0033736 A1* | 2/2015 | Kalebjian ........... F02B 29/0412 60/605.2 |
| 2015/0047340 A1* | 2/2015 | Ulrey ...................... F02B 47/08 60/600 |
| 2015/0315960 A1* | 11/2015 | Thomas .................. F02B 37/04 123/564 |
| 2017/0058795 A1* | 3/2017 | Schmitt ............... F02D 41/0007 |
| 2017/0130664 A1* | 5/2017 | Rueger .................... F02B 39/10 |
| 2017/0350353 A1* | 12/2017 | Nemesh ........... F02M 35/10157 |
| 2017/0362995 A1* | 12/2017 | Saindon ............... F02B 29/0418 |

FOREIGN PATENT DOCUMENTS

| | | | |
|---|---|---|---|
| DE | 102015004741 A1 | 10/2016 | |
| FR | 2914026 A1 * | 9/2008 | ......... F02B 29/0475 |
| GB | 2432205 A | 5/2007 | |
| JP | 2013160117 A | 8/2013 | |
| WO | 2011102783 A1 | 8/2011 | |
| WO | WO-2017140682 A1 * | 8/2017 | ......... F02B 29/0418 |

* cited by examiner

SYSTEMS AND METHOD FOR CHARGE AIR COOLER DE-ICING

CROSS REFERENCE TO RELATED APPLICATION

The present application claims priority to German Patent Application No. 102017200800.8, filed Jan. 19, 2017. The entire contents of the above-referenced application are hereby incorporated by reference in its entirety for all purposes.

FIELD

The present description relates generally to methods and systems for controlling a vehicle engine to defrost a charge-air cooler.

BACKGROUND/SUMMARY

An internal combustion engine of the stated type is used as a motor vehicle drive unit. Within the context of the present disclosure, the expression "internal combustion engine" encompasses diesel engines as well as Otto-cycle engines and hybrid internal combustion engines, e.g., internal combustion engines that are operated using a hybrid combustion process. Hybrid engines may also use hybrid drives which comprise an electric machine in addition to the IC engine which may be connected in terms of drive to the internal combustion engine, receiving power from the internal combustion engine or which, as a switchable auxiliary drive, additionally outputs power.

In the development of internal combustion engines, it is desirable to minimize fuel consumption. Furthermore, a reduction of the pollutant emissions is sought in order to comply with future limit values for pollutant emissions. Thus, internal combustion engines are therefore ever more commonly being equipped with a supercharging arrangement, where supercharging is primarily a method for increasing power. Charge air for the combustion process in the engine is compressed, resulting in a supply of a greater mass of charge air to each cylinder per working cycle. In this way, the fuel mass and therefore the mean pressure may be increased.

Supercharging may increase the power of an internal combustion engine while maintaining an unchanged swept volume, or reduce the swept volume while maintaining the same power. Supercharging leads to an increase in volumetric power output and a more expedient power-to-weight ratio. If the swept volume is reduced, given the same vehicle boundary conditions, the load collective may be shifted toward higher loads, at which the specific fuel consumption is lower. Supercharging of an internal combustion engine consequently assists in minimizing fuel consumption, improving the efficiency of the internal combustion engine.

For supercharging, use is often made of an exhaust-gas turbocharger, in which a compressor and a turbine are arranged on the same shaft. The hot exhaust-gas flow is fed to the turbine and expands in the turbine with a release of energy, as a result of which the shaft is set in rotation. The energy released by the exhaust-gas flow to the turbine and ultimately to the shaft is used for driving the compressor which is likewise arranged on the shaft. The compressor conveys and compresses the charge air fed to it, as a result of which supercharging of the cylinders is obtained. A charge-air cooler (CAC) may be arranged in the intake system downstream of the compressor, that cools the compressed charge air before it enters the cylinders. The CAC lowers the temperature and thereby increases the density of the charge air, so that the cooling effect of the CAC improves charging of the cylinders, by allowing a greater air mass to be delivered. Compression by cooling takes place.

However, the cooling of the combustion air may give rise to problems. During the course of the cooling, liquids previously contained in the combustion air still in gaseous form, in particular water, may condense out if the dew point temperature of a component of the gaseous air flow is undershot or the air is saturated. If the precipitated condensate is not continuously discharged, and supplied to the cylinders, in extremely small quantities, for example owing to the kinetics of the air flow or by means of a suitable arrangement or configuration of the charge-air cooler used, condensate may collect in the charge-air cooler and/or in the intake system downstream of the charge-air cooler. The condensate may be abruptly introduced into the intake system from the CAC in an unpredictable manner and in relatively large quantities, for example in the presence of lateral acceleration as a result of cornering, or when traveling on a gradient or over a bump. The latter is also referred to as water hammer, which may lead not only to a severe disruption in the operation of the internal combustion engine but also lead to degradation of components downstream of the CAC.

The issue described above may be further intensified if the combustion air contains recirculated exhaust gas. By increasing the recirculated exhaust-gas (EGR) flow rate, fractions of the individual exhaust-gas components in the combustion air, and in particular of water contained in the exhaust gas, may increase. In the prior art, therefore, the EGR flow rate is in some cases limited in order to reduce the amount of condensed water or to prevent condensation.

The formation of condensate may be promoted by a high humidity of the ambient air and low ambient temperatures, where, in the presence of low ambient temperatures, in particular temperatures below the freezing point, ice may form, e.g., condensed water freezes in the intake system. If ice particles or ice deposits form in the CAC, the flow resistance of the cooler in the intake system increases, and pressure loss across the cooler increases, reducing the efficiency of the supercharged internal combustion engine.

Various attempts to address the formation of ice within the CAC include methods to increase the temperature of the CAC. On example approach is shown by Wolf in DE Patent Application 10,2008028,194. Therein, a pressure difference across a charge-air cooler is determined to infer the icing state of the charge-air cooler. If icing of the charge-air cooler is identified, the ice situated in the charge-air cooler may be melted by increasing the charge-air temperature at the cooler inlet, and thus the pressure loss across the cooler may be reduced. The inlet temperature of the air may be increased by various methods, for example, by increasing the pressure of the inflowing air and/or reducing the cooling power of the cooler.

Another example approach to address icing of the CAC is shown by in U.S. Pat. No. 9,109,505. Therein, an engine system including a turbocharger compressor with a compressor bypass may couple an outlet of a CAC downstream of the compressor to the compressor inlet. A compressor recirculation valve (CRV) is disposed in the compressor bypass, controlling gas flow through the bypass. During conditions leading to ice formation in the CAC, the CRV is opened in conjunction with closing an exhaust turbine wastegate. Exhaust pressure to spin the turbine is increased, resulting in warming of the air compressed by the compressor. The warmed air is recirculated around the compressor and the CAC, thereby expediting warming of the CAC.

However, the inventors herein have recognized potential issues with such systems. As one example, icing of the CAC can also be observed in the case of shut-down, that is to say non-fired internal combustion engines, in particular if the internal combustion engine is generally operated only for short periods in the presence of temperatures below the freezing point. Large amounts of ice may form in the charge-air cooler, resulting from ice situated in the charge-air cooler that is not melted during operation, and additional ice is newly formed after every period of operation of the internal combustion engine.

In one example, the issues described above may be addressed by a method for a supercharged internal combustion engine having at least one cylinder head comprising at least one cylinder, in which each cylinder has at least one inlet opening which is adjoined by an intake line for the supply of air via an intake system, each cylinder has at least one outlet opening which is adjoined by an exhaust line for the discharge of the exhaust gases via an exhaust-gas discharge system, a charge-air cooler (CAC) is provided in the intake system, and an electrically driveable compressor is arranged in the intake system, the electrically driveable compressor being the compressor of an exhaust-gas turbocharger, and where the internal combustion engine has a bypass line, which branches off from the intake system, so as to form a first junction point, downstream of the electrically driveable compressor and downstream of the CAC and opens into the intake system, so as to form a second junction point, upstream of the electrically driveable compressor and upstream of the charge-air cooler. In this way, the CAC may be sufficiently warmed to melt ice formed within the CAC.

As one example, the electrically driveable compressor heats the air situated in the intake system during the compression, and conveys the heated air via the bypass line back to the intake side of said intake system, that is to say to the inlet of said intake system. The electric compressor may operate even when boost assistance to an exhaust turbocharger is not requested or during vehicle conditions where the vehicle is a hybrid electric vehicle operating in a low energy consuming mode. In this way, air may be recirculated through the electric compressor so that additional compression air results in a warming of the air. The warmed air may melt ice condensed in the CAC, thereby avoiding a decrease in the performance of the CAC. Air charging provided by the turbocharger compressor and electric compressor is maintained and degradation to the CAC is prevented.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
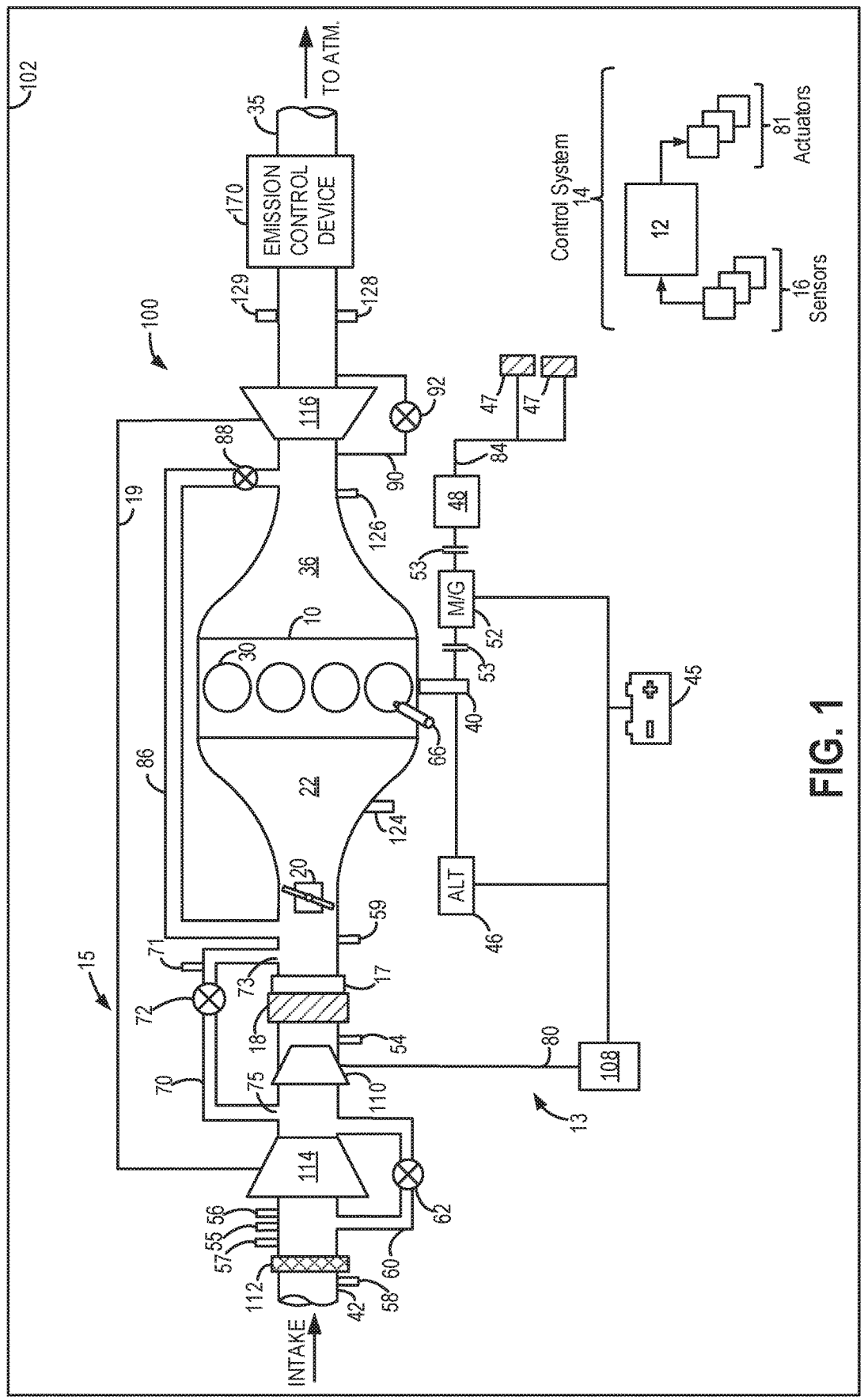
FIG. 1 shows an embodiment of a supercharged hybrid electric engine.
Figure 2:
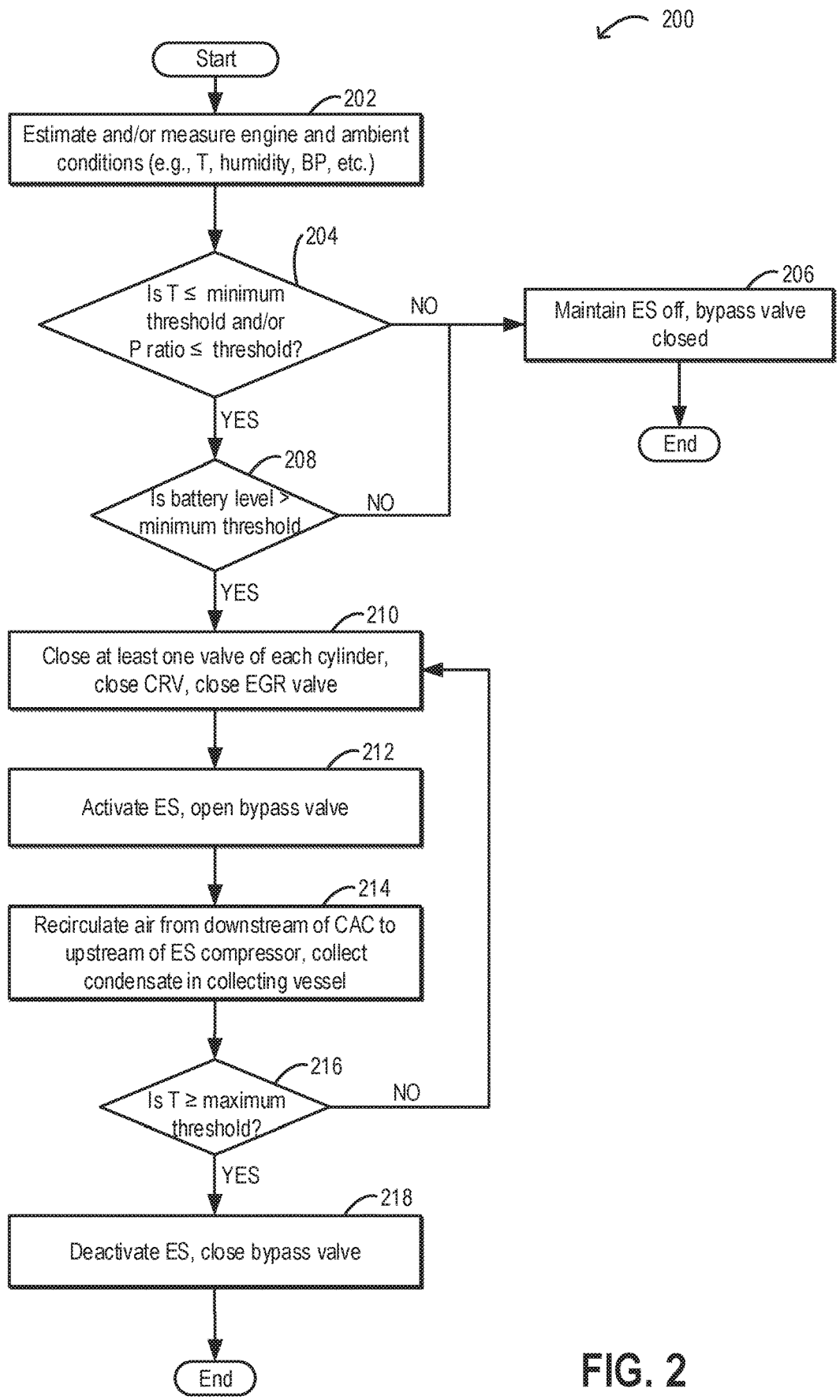
FIG. 2 shows a flow chart for operating the supercharged hybrid electric engine during conditions leading to ice formation in a charge-air cooler of the engine.

The following description relates to systems and methods for de-icing a charge-air cooler (CAC). The CAC may be arranged in a turbocharged hybrid engine system coupled with a boost assist device such as an electric supercharger. An example embodiment of such an engine system is shown at FIG. 1. A bypass passage with a bypass valve controlling air flow therethrough may be included to recirculate compressed air from an intake passage downstream of the CAC to a region upstream of the supercharger compressor inlet. An engine controller may be configured to perform a control routine, such as the example routine of FIG. 2, to operate the supercharger and bypass valve of the air recirculation path during conditions where low ambient temperatures may lead to ice formation in the CAC.

The engine system may comprise an exhaust-driven turbocharger to boost intake air delivered to cylinders of the engine. The turbocharger has an exhaust gas turbine that is spun by exhaust gas flow through an exhaust gas passage channeling exhaust gas from an exhaust manifold of the engine. A compressor is connected to the turbine by a drive shaft, through which rotation of the turbine is mechanically translated to the compressor. The compressor, arranged in the intake system, boosts intake air, thus increasing density of the air delivered to the cylinders for combustion.

However, difficulties may be encountered in achieving an increase in power in all engine speed ranges, and in particular without a delay, by means of exhaust-gas turbocharging. A relatively severe torque drop may be observed in the event of a certain engine speed being undershot. The torque drop arises from dependency of the charge pressure ratio on the turbine pressure ratio or the turbine power. If the engine speed is reduced, this leads to a smaller exhaust-gas mass flow and therefore to a lower turbine pressure ratio or a lower turbine power. Consequently, toward lower engine speeds, the charge pressure ratio likewise decreases. This equates to a torque drop.

The performance of an internal combustion engine boosted by exhaust-gas turbocharging may be reduced by a period of delay, in the presence of an increased load demand, during which the turbine power must be increased in order to provide the required drive power for the compressor. In transient operation of the internal combustion engine, this leads to a certain deceleration effect, which is undesired.

It is possible to improve the torque characteristic of an exhaust-gas-turbocharged internal combustion engine. For example, the turbine cross section may be reduced along with simultaneous provision of an exhaust-gas blow-off facility. Such a turbine is also referred to as a wastegate turbine. If the exhaust-gas mass flow exceeds a threshold value, a part of the exhaust-gas flow is, within the course of the so-called exhaust-gas blow-off, conducted via a bypass line past the turbine. This approach has the disadvantage that the boosting behavior is less satisfactory at relatively high engine speeds or in the case of relatively large exhaust-gas flow rates.

The torque characteristic may also be affected by arrangement of multiple exhaust-gas turbochargers connected in series. By connecting two exhaust-gas turbochargers in series, of which one exhaust-gas turbocharger serves as a high-pressure stage and one exhaust-gas turbocharger serves as a low-pressure stage, the engine characteristic map or compressor characteristic map can advantageously be expanded, specifically both in the direction of smaller compressor flows and also in the direction of larger compressor flows.

In particular, with the exhaust-gas turbocharger which serves as a high-pressure stage, it is possible for the surge limit to be shifted in the direction of smaller compressor flows, as a result of which high charge pressure ratios can be obtained even with small compressor flows, which considerably improves the torque characteristic in the lower engine speed range. This is achieved by configuring the high-pressure turbine for small exhaust-gas mass flows and by providing a bypass line by means of which, with increasing exhaust-gas mass flow, an increasing amount of exhaust gas is conducted past the high-pressure turbine. The bypass line branches off from the exhaust-gas discharge system upstream of the high-pressure turbine and opens into the exhaust-gas discharge system again upstream of the low-pressure turbine, where a shut-off element is arranged in the bypass line in order to control the exhaust-gas flow conducted past the high-pressure turbine.

The transient response of the engine system adapted with multiple boosting devices, e.g., turbochargers, may be further improved by configuring one of the devices, arranged downstream of the turbocharger, as an electric supercharger. While an exhaust-gas utilizes the exhaust-gas energy of the hot exhaust gases, the supercharger draws energy directly or indirectly from the engine which may reduce the efficiency of the engine, at least for as long as the drive energy does not originate from an energy recovery source. If the supercharger or compressor is not one that can be driven by means of an electric machine, that is to say electrically, a mechanical or kinematic connection for power transmission is generally arranged between the supercharger and the internal combustion engine, which also adversely affects or determines the packaging in the engine bay.

However, the supercharger may be driven by an auxiliary drive in contrast to an exhaust-gas turbocharger, allowing the supercharger to generate, and make available, a desired boost pressure at all times, with minimal delay and regardless of the operating state of the engine. This applies in particular to a supercharger which may be driven electrically by an electric machine, and is therefore independent of a rotational speed of a crankshaft.

Other advantages of using an electric supercharger include engine downspeeding, whereby a lower specific fuel consumption is likewise achieved. Downspeeding, uses a low fuel consumption at low engine speeds in the presence of relatively high loads. The engine is thus allowed to operate at a speed that increase fuel efficiency while generating a minimal horsepower to maintain a cruise speed. Also, provide boost assistance from a supercharger may reduce nitrogen oxide emissions without any losses in efficiency. At the same time, the hydrocarbon emissions may be positively influenced. The emissions of carbon dioxide, which correlate directly with fuel consumption, may decrease with reduced fuel consumption.

The supercharged engine may be equipped with an electrically driveable compressor which, also in addition to being used for supercharging of engine, when the internal combustion engine is in a shut-down state, introduces heat by compression into the air situated in the intake system, such that heated air, e.g., air at an elevated temperature, is supplied to the CAC arranged in the intake system. In this way, formation of ice in the CAC after a shut-down of the internal combustion engine may be counteracted in an effective manner, or still-frozen water situated in the CAC may be melted and discharged from the CAC.

Since no air is to be supplied, or may be supplied, to the cylinders when the internal combustion engine is in a shut-down state, the valve drives are deactivated, and the inlet openings are no longer opened up for the supply of air, the engine is equipped with a bypass line which allows the heated air to be conveyed in a circuit, or circulated, by the electrically driveable compressor of the supercharger. The bypass line branches off from the intake system, so as to form a first junction point, downstream of the electrically driveable compressor and downstream of the CAC and opens into the intake system, so as to form a second junction point, upstream of the electrically driveable compressor and upstream of the CAC. The electrically driveable compressor may be arranged downstream or upstream of the CAC, but preferably arranged upstream of the CAC so that the heat is introduced into the air as close as possible to that point in the intake system at which the heated air is to warm an object, such as the CAC.

In an exhaust-gas-turbocharged engines, the electrically driveable compressor may be arranged in the intake system downstream of the compressor of the exhaust turbocharger. Thus, the air heated by the electrically driveable compressor is not conveyed through the compressor of the exhaust-gas turbocharger. By arranging the electrically driveable compressor downstream of the compressor of the exhaust turbocharger, the electrically driveable compressor may be a high-pressure stage in the context of a two-stage compression or supercharging arrangement.

A drive power of the electrically driveable compressor may not be provided directly and simultaneously by the engine, as a result of which the electrically driveable compressor may be utilized for the compression, or for the introduction of heat, even when the engine is in a deactivated state and no firing is being performed in said engine. The electrically driveable compressor may be deactivated as soon as the above-described demand situation no longer exists. The electrically driveable compressor may also be used during nominal operation, e.g., low engine speeds and loads, of the internal combustion engine in order to improve the transient operating behavior of the engine and the torque characteristic at low engine speeds or in the presence of low exhaust gas flow rates.

With regard to the supercharging of an operational internal combustion engine, the electrically driveable compressor, in contrast to the exhaust-gas turbocharger, may generate, and make available, the demanded boost pressure regardless of the current operating state of the engine, even in the presence of lower exhaust gas flow rates or low rotational speeds of the crankshaft, and may do so without a delay.

In some examples, the supercharged engine the bypass line boosted air recirculating through the electrically driven compressor may be equipped with a shut-off element, also referred to as a bypass valve. Opening the shut-off element allows the bypass line to be opened up, and thus permits the recirculation of heated air by means of the electrically driveable compressor, if icing of the CAC is to be prevented or depleted. By adjusting the shut-off element, the air flow rate to be recirculated by the electrically driveable compressor may be controlled, and adjusted. The formation of ice, and for still-frozen water situated in the charge-air cooler may thus be melted and discharged from the CAC. The temperature of the heated air and/or the air flow rate is not high enough, however, to evaporate the melted ice.

The liquid water may be separated off and collected in a vessel. Vapor phase water, however, is not readily separated and collected. The presence of vaporous water after deactivation of the electrically driveable compressor when the engine is in a shut-down state may lead to condensation and formation of ice again. To avoid this issue, the temperature of the heated air must be maintained below a threshold that prevents evaporation of water during melting. Therefore, a sensor may be included in the bypass line for detecting, by measurement, the temperature of the air conveyed or recirculated via the bypass line. The sensor is may be arranged upstream of the shut-off element provided in the bypass line.

A collecting vessel for condensate may be arranged in the intake system downstream of the CAC. The vessel collects liquid water and removes water from the rest of the intake system, mitigating issues arising from formation of condensate. Separated-out condensate is entrained by the charge-air flow owing to kinetics, and is discharged or separated off into the collecting vessel.

Like the water in the CAC, the water situated in the collecting vessel may freeze. Formation of ice in the collecting vessel does not affect performance of the CAC, because it does not block the intake system or degrade the collecting vessel. Ice deposits in the collecting vessel also does not lead to an increased pressure loss in the intake system. Such a pressure loss in the intake system downstream of the supercharger compressor may result in a drop in charge pressure or a charge-pressure loss, which is undesirable in the context of the supercharging of the engine, and hinders effective supercharging.

The electrically driveable compressor conveys the heated humid air in a circuit via the collecting vessel when the engine is in a shut-down state, e.g., the conveyed air passes the collecting vessel as it circulates in the bypass line and in the intake system. The CAC may be configured to be self-draining, avoiding condensate accumulation in the CAC by draining condensate into the collecting vessel.

Other effects of adapting the engine with multiple boosting devices, e.g., the supercharger or the turbocharger, may include, as one example, a downsizing of the engine. The downsizing effect is enhanced by multi-stage supercharging by combining the turbocharger with the supercharger, rather than two exhaust turbochargers, due to a smaller size of the supercharger with respect to the turbocharger. Furthermore, the response behavior of an internal combustion engine supercharged in this way is considerably improved in relation to a similar internal combustion engine with a single boosting device, because the relatively small high-pressure stage is less inert, and the rotor of a smaller-dimensioned supercharger may be accelerated more rapidly. The torque characteristic of the supercharged engine may furthermore be improved by multiple turbochargers arranged in parallel, for example, by multiple turbines of relatively small turbine cross section arranged in parallel, where the turbines are activated successively with increasing exhaust-gas flow rate.

Turning now to FIG. 1, an example boosted engine system 100 is illustrated, comprising an engine 10 of a vehicle 102. In some examples, vehicle 102 may be a hybrid electric vehicle with multiple sources of torque available to one or more vehicle wheels 47. In the example shown, a powertrain of vehicle 102 includes engine 10 and an electric machine 52 which may be a motor or a motor/generator. Engine 10 and electric machine 52 are connected to vehicle wheels 47 via a transmission 48 when one or more clutches 53 are engaged. In the example of FIG. 1, a first clutch 53 is shown between engine 10 and electric machine 52 and a second clutch 53 is arranged between electric machine 52 and transmission 48. A controller 12 may instruct an actuator of each clutch 53 to engage or disengage the clutch, thereby connecting or disconnecting engine 10 from electric machine 52 and the components connected thereto and/or connecting or disconnecting electric machine 52 from transmission 48 and the components connected thereto. For example, torque from engine 10 may be transferred to vehicle wheels 47 via a crankshaft 40, transmission 48, and a powertrain shaft 84 when clutches 53 are engaged. Transmission 48 may be a gearbox, a planetary gear system, or another type of transmission. Transmission 48 may be a fixed ratio transmission that includes a plurality of gear ratios to allow engine 10 to rotate at a different speed than wheels 47. By changing a torque transfer capacity of first clutch 53 (e.g., an amount of clutch slippage), an amount of engine torque relayed to the wheels via powertrain shaft 84 may be modulated.

The powertrain may be configured in various manners, including as a parallel, a series, or a series-parallel hybrid vehicle. In electric vehicle embodiments, a system battery 45 may be a traction battery that delivers electrical power to electric machine 52 to provide torque to vehicle wheels 47. In some embodiments, electric machine 52 may also be operated as a generator to provide electrical power to charge system battery 45, for example, during a braking operation. It will be appreciated that in other embodiments, including non-electric vehicle embodiments, system battery 45 may be a typical starting, lighting, ignition (SLI) battery coupled to an alternator 46.

Alternator 46 may be configured to charge system battery 45 using engine torque drawn from the crankshaft during engine running. In addition, alternator 46 may power one or more electrical systems of the engine, such as one or more auxiliary systems including a heating, ventilation, and air conditioning (HVAC) system, vehicle lights, an on-board entertainment system, and other auxiliary systems based on their corresponding electrical demands. A voltage regulator may be coupled to alternator 46 in order to regulate the power output of the alternator based upon system usage requirements, including auxiliary system demands.

In the depicted embodiment, engine 10 is a compound boosted engine configured with multiple, staged boosting devices. Specifically, engine 10 includes a first boosting device staged upstream of a second boosting device. Herein, the first boosting device is a primary boosting device and the second boosting device is an auxiliary boosting device, although other configurations may be possible. The primary boosting device is configured as a turbocharger 15 while the auxiliary boosting device is configured as an electric supercharger (ES) 13. The depicted configuration results in a first compressor 114 (of the turbocharger 15) being positioned in an engine intake passage 42 upstream of a second compressor 110. The second compressor 110 is a compressor of the ES 13 connected to an electric motor 108 and configured to operate with electric assistance from the electric motor 108. However, other combinations and configurations of boosting devices may be possible without departing from the scope of this disclosure. For example, in alternate embodiments, turbocharger 15 may be an electric turbocharger having an electric motor coupled to the compressor, turbine, or turbocharger shaft while the supercharger is configured with one or two compressors. As well, the supercharger may be an electrical or mechanical supercharger. In still other examples, both the first and second boosting device may be electric superchargers or electric turbochargers.

The electrically driveable second compressor 110 of the ES 13 may be configured to be smaller than the first compressor 114 of the turbocharger 15. In arrangements where the second compressor 110 is positioned in the intake system downstream of the first compressor 114, the second compressor 110 may be used as high-pressure stage in the context of a two-stage compression. Thus, a smaller size of the second compressor 110 is often sufficient for heating and circulating air when the engine 10 is in a shut-down state.

Turbocharger 15 includes first compressor 114, which is driven by a turbine 116. First compressor 114 is shown as a turbocharger compressor mechanically coupled to turbine 116 via a shaft 19, the turbine 116 driven by expanding engine exhaust. In one embodiment, the turbocharger may be a twin scroll device. In another embodiment, the turbocharger turbine 116 has a fixed turbine geometry. Overall system costs may be reduced by using the inexpensive fixed turbine geometry where guide blades in a nozzle of the turbine 116 are not only stationary but are also completely immovable, if guide blades or a guide device are or is provided at all. For improved torque characteristic, however, the turbine 116 may be a wastegate turbine, described further below with respect to wastegate 90.

Other examples of turbocharger 15 may include the turbocharger 15 configured with a variable turbine geometry. The variable turbine geometry increases the flexibility of the supercharging. The turbine geometry may be continuously adjusted to the respective operating point of the internal combustion engine and to the present exhaust gas mass flow. Guide blades for influencing the flow direction are arranged upstream of the impeller of the turbine 116. In contrast to the impeller blades of the rotating impeller of the turbine 116, the guide blades do not rotate. The guide blades are arranged to be stationary but rotatable about an axis such that the flow of gas approaching the turbine impeller blades may be controlled.

Furthermore, a combination of the turbine 116 with variable turbine geometry and first compressor 114 with variable compressor geometry may allow the turbocharger 15 to deliver high charge pressures even in the presence of very low exhaust-gas flow rates. Variable compressor geometry may be used when a small exhaust-gas flow rate is conducted through the turbine 116 so that, by adjustment of the compressor guide blades, the surge limit of the first compressor 114 in the compressor characteristic map may be shifted in the direction of small compressor flows, and thus the first compressor 114 is prevented from operating beyond the surge limit. Variable compressor geometry also results in high air recirculation rates when high exhaust gas flow rates are branched off upstream of the turbine and recirculated, such as in exhaust gas recirculation systems (EGR). If the turbine 116 of turbocharger 15 has variable turbine geometry, variable compressor geometry may be adapted continuously to the turbine geometry.

The rotation of the turbine 116, driven by exhaust gas, compels the rotation of first compressor 114. Fresh air is introduced along intake passage 42 into engine 10 via air box 112 and flows to first compressor 114. During selected conditions, air compressed by turbocharger 15 may be recirculated from an outlet to an inlet of first compressor 114 through a compressor recirculation passage 60 by adjusting an opening of a compressor recirculation valve (CRV) 62. CRV 62 may be a continuously variable valve, and increasing the opening of the CRV 62 may include actuating (or energizing) a solenoid of the valve. In some embodiments, CRV 62 may be partially open during boosted engine operation to provide a surge margin. Herein, the partially open position may be a default valve position. Then, in response to an indication of surge, the opening of CRV 62 may be increased. For example, CRV 62 may be adjusted from the default, partially open position toward a fully open position, with a degree of opening based on the indication of surge (e.g., the compressor ratio, the compressor flow rate, a pressure differential across the compressor, etc.). In alternate examples, CRV 62 may be held closed during boosted engine operation (e.g., peak performance conditions) to decrease boost response time and increase peak performance.

Operation of first compressor 114 increases a boost pressure downstream of first compressor 114 in intake passage 42. Air boosted by first compressor 114 flows into second compressor of ES 13 which is driven by the electric motor 108. Specifically, a wheel of second compressor 110 may be driven by power received from electric motor 108 along supercharger compressor shaft 80. In some examples, second compressor 110 of ES 13 may additionally be driven by the engine crankshaft 40 via a clutch and gear mechanism. Electric motor 108 may be powered by an on-board energy storage device, such as system battery 45. Electric motor 108 may be additionally or alternatively powered by alternator 46. An amount of electrical power delivered to electric motor 108 may be varied in order to adjust a duty cycle of the ES 13. In one example, the amount of electric power delivered to electric motor 108 may be increased to increase the speed of second 110. As a result of the electrical assistance, ES 13 may be rapidly spun up, providing for a fast-acting or high frequency boost actuation.

Electric motor 108 may be configured as a motor-generator. Thus, during conditions when electric assistance is required for boost build-up, electric motor 108 may provide positive torque to drive either the centrifugal compressor of the ES 13 (or the turbocharger shaft) to improve the transient boost pressure delivery. However, electric motor 108 is also capable of energy recuperation by "braking" the motor shaft. Therein, negative torque may be applied to the compressor (or shaft), reducing the compressor speed and concurrently charging the system battery (such as battery 45) coupled to the motor.

Air compressed by the first and/or the second compressor is then directed to the intake manifold 22 via passage through each of a charge-air cooler (CAC) 18 (also referred to as an intercooler herein), and a throttle valve 20, in that order. Intake manifold pressure (e.g., a pressure of the air charge within the intake manifold) may be determined using a manifold absolute pressure (MAP) sensor 124. CAC 18 may be an air-to-air or water-to-air heat exchanger, for example. A collecting vessel 17 is coupled to CAC 18 to collect condensate from CAC 18.

In one example, CAC 18 may be set at an angle such that a downward slope is formed between an inlet and an outlet of CAC 18, the outlet being downstream of the inlet, and transport of condensate is assisted in a gravity-driven manner to counteract any accumulation. CAC 18 may be configured to be self-draining when the inlet of CAC 18 is arranged geodetically higher than the outlet. Condensate may then flow along the downward slope from the inlet to the outlet of the CAC to accumulate in the collecting vessel 17.

A first junction 73 of a bypass 70 may branch off of intake passage 142 at a point downstream of CAC 18 and upstream of throttle 20. Bypass 70 also couples to intake passage 142 at a second junction 75 that is upstream of the first junction 73 and at a point between first compressor 114 and second compressor 110. A path for air flow is provided by bypass 70 that may recirculate boosted air in a first direction from downstream of CAC 18 to intake passage 142 upstream of an inlet of second compressor 110. Alternatively, air compressed by first compressor 114 may flow in a second, opposite, direction through bypass 70 from the second junction 75 to the first junction 73 to bypass ES 13 and deliver air boosted by first compressor 114 directly to intake manifold 22.

Bypass 70 includes a bypass valve 72 arranged in the path of flow. Bypass valve 72 may control flow through bypass 70 and, in one example, may be configured as an on/off valve. Alternatively, bypass valve 72 may be a continuously variable valve. In some embodiments, bypass valve 72 may be closed during boosted engine operation to allow ES 13 to provide boost assist during engine transients or when the boost supplied by first compressor 114 is not sufficient to meet the boost demand. Bypass valve 72 may be opened during high engine speed and low loads, when downspeeding may occur, when ES 13 is not activated and may be bypassed without adversely affecting engine performance. Air is flowed from first compressor 114 through bypass 70 in the second direction and delivered to intake manifold 22 via throttle valve 20 in an at least partially open position.

Air may be flowed in the first direction through bypass 70 when bypass valve 72 is open, ES 13 is activated, but throttle valve 20 is closed. Throttle valve 20 may be closed when vehicle 102 is stationary, with engine 10 turned off either in a vehicle shutdown mode or while vehicle 102 is idling. When vehicle 102 is a hybrid electric vehicle, idling may comprise the engine system converting to an electric vehicle (EV) mode that allows the engine to be turned off while drawing energy exclusively from the system battery 45. Additional operation of the electric motor 108 of ES 13 during idling may decrease the all-electric range (AER) of the hybrid electric vehicle thus operation of ES 13 during air recirculation through bypass 70 may occur over brief intervals of time. Alternatively, if vehicle 102 has a conventional IC engine, e.g., not adapted with the EV mode, operation of ES 13 when vehicle 102 is turned off and alternator 46 is not active may result in depletion of battery 45 and, thus, recirculation of air driven by ES 13 may not be desirable.

Bypass 70 may also include a bypass temperature sensor 71 to measure a temperature of the air flowing through bypass 70. Actuation of the ES 13 and opening of the bypass valve 72 when engine 10 is turned off may be based on a combination of an air temperature detected by bypass temperature sensor 71 and a moisture level of the intake air detected by a humidity sensor 54.

For example, controller 12 may command ES 13 to turn on and open the bypass valve 72 when the air temperature measured by bypass temperature sensor 71 falls below a first threshold that may lead to freezing of water in CAC 18. Air is recirculated through bypass 70 and warmed by compression, thus warming CAC 18 and preventing freezing of water and/or melting ice formed in CAC 18. When the temperature detected by bypass temperature sensor 71 reaches a second threshold, higher than the first threshold but below a temperature that may cause evaporation, ES 13 may be deactivated and bypass valve 72 closed.

In order to effectively warm CAC 18 with recirculated boosted air and avoid loss of warmed air, recirculation may occur within a closed system. Thus, operations for mitigating ice formation in CAC 18 may also include closing CRV 62, closing an EGR valve 88, and closing at least one of an intake valve or exhaust valve of each cylinder 30 of engine 10. A coolant pump may be deactivated to prevent a cooling effect on CAC 18 from coolant flowing through a cooling circuit coupled to CAC 18 and/or other heat exchange devices such as a radiator. Furthermore, defrosting of CAC 18 may be conducted in conjunction with a heating ventilation and air conditioning (HVAC) system of vehicle 102. For example, during initial vehicle startup in cold ambient conditions, the HVAC system is used to warm the vehicle cabin and dehumidify the air blown across a windshield of vehicle 102, and heat may be transferred to a condenser of an air conditioner of the HVAC system. The heat is typically lost to the environment but may, instead, be channeled to intake passage 42. By using heat generated during cabin defrosting, warm air may be introduced to CAC 18 to prevent ice formation in CAC 18 during early stages of vehicle operation subsequent to initial startup.

Air passing through CAC 18 is cooled and a density of the air is increased before flowing to intake manifold 22. Intake manifold 22 is coupled to a series of combustion chambers 30 through a series of intake valves (not shown). The combustion chambers are further coupled to an exhaust manifold 36 via a series of exhaust valves (not shown). In the depicted embodiment, a single exhaust manifold 36 is shown. However, in other embodiments, the exhaust manifold may include a plurality of exhaust manifold sections or banks. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted for the desired combustion and emissions-control performance. For example, the cam timing may be adjusted via a variable cam timing system to move the intake and exhaust cams to a position that provides the optimal volumetric efficiency for the given operating conditions.

Combustion chambers 30 may be supplied one or more fuels, such as gasoline, alcohol fuel blends, diesel, biodiesel, compressed natural gas, etc. Fuel may be supplied to the combustion chambers via direct injection, port injection, throttle valve-body injection, or any combination thereof. In the depicted example, fuel is provided to each combustion chamber 30 via direct injection by a fuel injector 66 (while only one fuel injector is shown in FIG. 1, each combustion chamber includes a fuel injector coupled thereto). Fuel may be delivered to fuel injector 66 by a fuel system (not shown) including a fuel tank, a fuel pump, and a fuel rail. In the combustion chambers, combustion may be initiated via spark ignition and/or compression ignition.

As shown in FIG. 1, exhaust from exhaust manifold 36 is directed to turbine 116 to drive the turbine. When reduced turbine torque is desired, a portion of exhaust may be directed instead through a wastegate 90, bypassing turbine 116. A wastegate actuator 92 (e.g., wastegate valve) may be actuated open to relieve at least some exhaust pressure from upstream of turbine 116 to a location downstream of turbine 116 via wastegate 90. By reducing exhaust pressure upstream of turbine 116, turbine speed may be reduced. When increased boost pressure is demanded, first compressor 114 may be spooled up by spooling up turbine 116. Therein, more turbine torque is provided by directing a larger portion of exhaust to be directed through the turbine, and not through wastegate 90. Wastegate actuator 92 (e.g., wastegate valve) may be actuated closed to increase the exhaust pressure upstream of turbine 116. By increasing the exhaust pressure upstream of turbine 116, turbine speed may be increased.

The combined flow from turbine 116 and wastegate 90 flows through an emission control device 170. In general, emission control device 170 may include one or more exhaust after-treatment components configured to reduce an amount of one or more substances in the exhaust flow. For example, one exhaust after-treatment component may be configured to trap $NO_x$ from the exhaust flow when the exhaust flow is lean and to reduce the trapped $NO_x$ when the exhaust flow is rich. In other examples, an exhaust after-treatment component may be configured to disproportionate $NO_x$ or to selectively reduce $NO_x$ with the aid of a reducing agent. In still other examples, emission control device 170 includes a three-way catalyst configured to oxidize residual hydrocarbons and carbon monoxide while reducing $NO_x$ in the exhaust flow. Different exhaust after-treatment catalysts having any such functionality may be arranged in wash coats or elsewhere in emission control device 170, either separately or together. In some embodiments, the emission control device 170 may further include a regeneratable soot filter configured to trap and oxidize soot particles in the exhaust flow.

All or part of the treated exhaust from emission control device 170 may be released into the atmosphere via an exhaust conduit 35. Depending on operating conditions, however, some exhaust may be diverted instead to intake passage 42 via an exhaust gas recirculation (EGR) passage 86, including an EGR cooler (not shown) and EGR valve 88. Exhaust passage 86 is shown in FIG. 1 as a high pressure EGR (HP-EGR) loop, providing a passage coupling exhaust manifold 36 at a high pressure region upstream of turbine 116 to intake passage 42 at another high pressure region between the first junction 73 of bypass 70 and throttle valve 20. In other embodiments of engine system 100, a low pressure EGR loop (LP-EGR) may also be included providing a low pressure exhaust path between a point downstream of turbine 116 and upstream of emission control device 170 to intake passage 42 upstream of first compressor 114. Recirculation of exhaust gas and accompanying engine dilution reduces nitrogen oxide ($NO_x$) emissions, and thus increasing EGR flow may decrease release of $NO_x$ to the environment.

One or more sensors may also be coupled to intake passage 42 upstream of first compressor 114 for determining a composition and condition of aircharge entering the compressor. These sensors may include, for example, a pressure sensor 58 for estimating a barometric pressure of air upstream of air box 112. Other sensors include a temperature sensor 55 for estimating a compressor inlet temperature, and a pressure sensor 56 for estimating a compressor inlet pressure. Still other sensors may include, for example, air-fuel ratio sensors, humidity sensors, etc. Likewise, one or more sensors may also be coupled to intake passage 42 downstream of the first compressor 114 and upstream of the second compressor 110 for determining a composition and condition of air charge entering the second compressor. In other examples, one or more of the first or second compressor inlet conditions (such as humidity, temperature, etc.) may be inferred based on engine operating conditions. The sensors may estimate a condition of the intake air received at the second compressor inlet from the intake passage. Humidity sensor 54 may measure a moisture content of air flowing into CAC 18 while pressure sensors disposed at the inlet and the outlet of CAC 18 may measure a pressure ratio across the inlet and outlet of CAC 18. In addition, a throttle inlet pressure (TIP) sensor 59 may be coupled downstream of CAC 18 and upstream of throttle valve 20 for estimating a boost pressure delivered to the engine.

Controller 12 may be included in a control system 14. Controller 12 is shown receiving information from a plurality of sensors 16 (various examples of which are described herein) and sending control signals to a plurality of actuators 81 (various examples of which are described herein). As one example, sensors 16 may include an exhaust gas sensor 126 located upstream of turbine 116, MAP sensor 124, an exhaust temperature sensor 128, an exhaust pressure sensor 129, compressor inlet temperature sensor 55, compressor inlet pressure sensor 56, a mass air flow (MAF) sensor 57, pressure sensor 58, TIP sensor 59, humidity sensor 54, and bypass temperature sensor 71. Other sensors, such as additional pressure, temperature, air/fuel ratio, and composition sensors, may be coupled to various locations in engine system 100. The actuators 81 may include, for example, throttle valve 20, bypass valve 72, electric motor 108, wastegate actuator 92, fuel injector 66, CRV 62, and EGR valve 88. Controller 12 may receive input data from the various sensors, process the input data, and employ the various actuators to adjust engine operation based on the received signals and instructions stored on a memory of the controller. The controller may employ the actuators in response to the processed input data based on instruction or code programmed therein corresponding to one or more routines, such as example control routine described herein with regard to FIG. 2. As an example, responsive to the measured temperature at the bypass passage bypassing the ES falling below a minimum threshold, the controller may actuate the electric motor driving the ES compressor and actuate the bypass valve open to recirculate air to warm the CAC.

Figure 3:
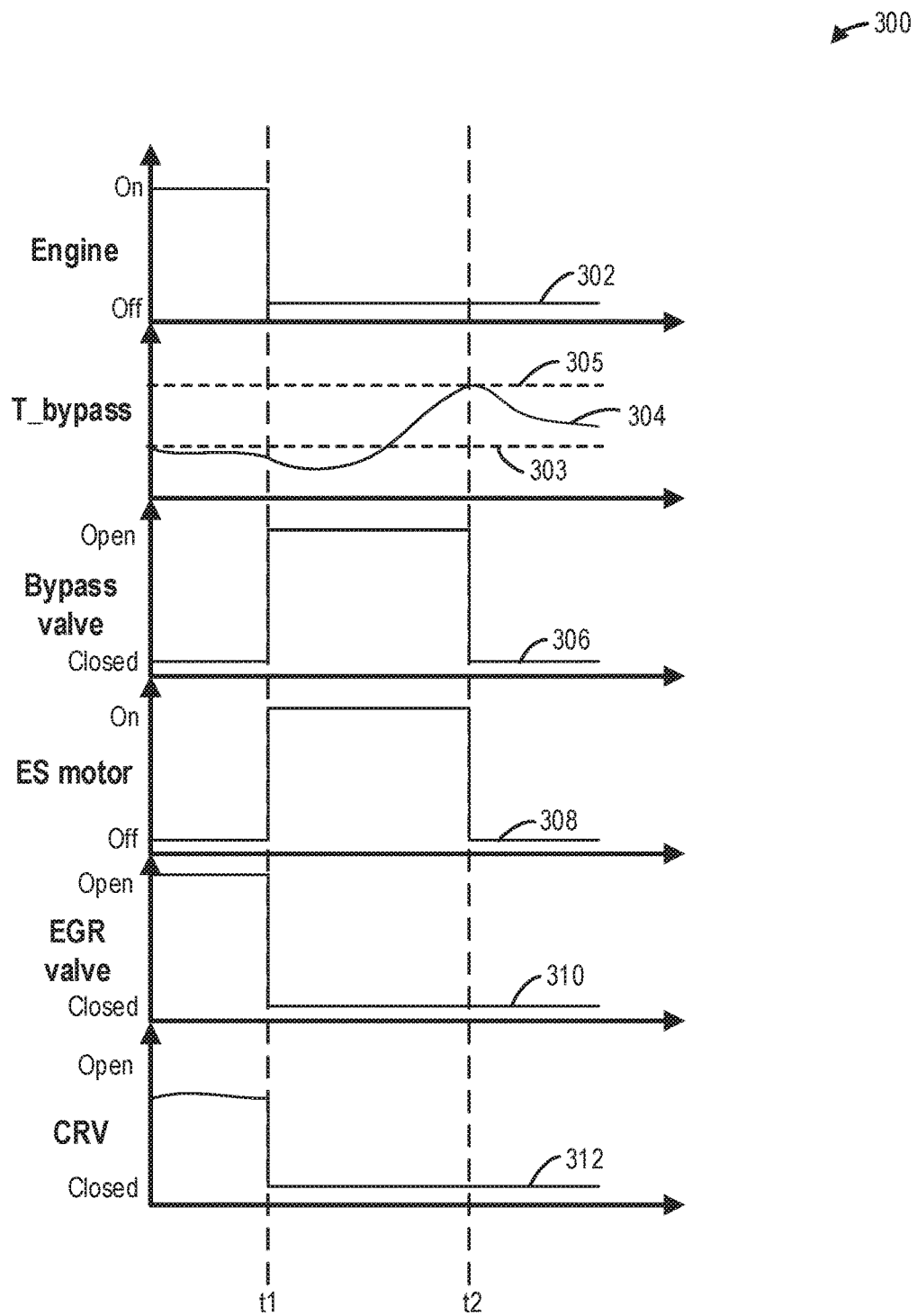
FIG. 3 shows an example engine operation map depicting the operation of the supercharger and a bypass valve in a bypass passage of the engine.

An example method 300 for defrosting a charge-air cooler (CAC) while an engine of a hybrid electric vehicle is turned off is shown at FIG. 3. The engine system may include at least two, serially arranged intake compression devices, at least one which includes electric assist. One of the at least two compression devices may be a slower acting (lower frequency), larger, exhaust-driven device, such as turbocharger 15 of FIG. 1. Another of the two compression devices may be a fast acting (higher frequency), smaller compression device, such as electric supercharger (ES) 13 of FIG. 1. A bypass is arranged between a region downstream of the CAC to a region upstream of the ES compressor along an intake passage, providing a recirculation route for boosted air. Instructions for carrying out method 200 and the rest of the methods included herein may be executed by a controller (e.g., controller 12 of FIG. 1) based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, method 200 includes estimating and/or measuring engine and ambient conditions. The vehicle, with the engine turned off, ES off, and bypass valve closed, may be in a shutdown mode or in an EV mode. In both modes, sensors, actuators, and the controller are operated based on energy drawn from a system battery, such as battery 45 of FIG. 1. Examples of conditions assessed may include ambient humidity, measured at an opening of the intake passage, ambient temperature, barometric pressure, moisture levels within the intake passage, as detected by sensors discussed previously.

At 204, method 200 includes determining if a temperature of air in the bypass measured by a temperature sensor, such as bypass temperature sensor 71 of FIG. 1, is at or less than a minimum temperature threshold. The minimum temperature threshold may be a temperature below which air flowing through the intake passage and cooled by the CAC may induce ice formation in the CAC. In one example, the minimum temperature threshold may below the freezing temperature of water, at −5° C. However, the minimum temperature threshold may vary based on a relative humidity of ambient air and amount of moisture detected in the intake passage. For example, in geographic regions with high levels of moisture in the air, intake air may contain more evaporated water, resulting in higher levels of condensation in the CAC. The minimum temperature threshold may be set at warmer than −5° C. due to the greater likelihood of ice formation when humidity is determined to be high. A moisture content of intake air may be detected by a humidity sensor arranged upstream of the CAC, such as humidity sensor 54 of FIG. 1. The controller may refer to a look-up table stored in a memory of the controller providing dew point as a function of temperature and humidity and adjust the threshold temperature accordingly.

Additionally or alternatively, the method may determine if a pressure ratio across the CAC is at or less than a pressure ratio threshold and store the pressure ratio in a memory of the controller before the engine is turned off. The pressure ratio may be based on a pressure at an outlet of the CAC relative to a pressure at an inlet of the CAC detected by pressure sensors described above while the engine is operating and air compressed by the turbocharger is flowing through the CAC. As ice forms and accumulates in channels of the CAC, air flow may become increasingly restricted, resulting in a $P_{outlet}/P_{inlet}$, where $P_{outlet}$ is the pressure measured at the CAC outlet and $P_{inlet}$ is the pressure measured at the CAC inlet, lower than 1. In one example, the pressure ratio threshold may be set at $P_{outlet}/P_{inlet}=1$.

Furthermore, the method may use either the bypass air temperature threshold or the CAC pressure ratio threshold independent of one another to proceed. For example, if the pressure ratio does not fall below the pressure ratio threshold but the bypass air temperature is determined to be less than the minimum temperature threshold, the method continues to 208. This may occur due to a delay in condensation of moisture in the CAC resulting from rapid movement of the air. As well, a decrease in pressure across the CAC may not be detected until a minimum amount of ice has accumulated in the channels of the CAC. By providing an alternative condition, e.g., the minimum temperature threshold, ice accumulation may be prevented altogether. In another example, if the bypass air temperature above the minimum temperature threshold pressure ratio but the pressure ratio is below the pressure ratio threshold, the method also continues to 208.

If the temperature detected at the bypass temperature sensor is not below the minimum threshold and the pressure ratio across the CAC is not below the pressure ratio threshold, the ES is maintained off at 206 and the bypass valve kept closed. If the temperature is detected to be at or below the minimum threshold and/or the pressure ratio across the CAC is at or above the pressure ratio threshold, the method continues to 208 to determine if the system battery contains a charge level that is above a minimum charge threshold. The minimum charge threshold may be an amount of charge in the battery sufficient to operate the sensors, actuators and drive the electric motor of the ES. When the engine is off, re-charging of the battery by the gasoline-powered motor (or other fuel type) is not provided. Thus, in order for the hybrid electric vehicle to experience fuel economy benefits of the hybrid energy system, the minimum charge threshold may be set during vehicle idling to channel the battery charge towards maintaining the vehicle in the EV mode rather than diverting power to activate the ES if the charge level is not sufficient to run both operations.

If the battery charge is measured or inferred to be at or less than the minimum threshold, the method proceeds to 206, maintaining the ES off and the bypass valve closed. In addition, the method may continue to 206 if the battery charge is at the minimum threshold. If the battery charge is higher than the minimum threshold, the method continues to 210 to close either an intake valve or an exhaust valve of each cylinder of the engine. The intake valve and exhaust valve may be electronically actuatable. A compressor recirculation valve (e.g., CRV 62 of FIG. 1) and an EGR valve (e.g., EGR valve 88 of FIG. 1) may be commanded to close in response to detection of the bypass air temperature falling below the minimum threshold and the battery charge at a level above the minimum charge threshold.

At 212, the ES is activated and the bypass valve is opened, allowing air to recirculate from downstream of the CAC to upstream of the ES compressor at 214 through the bypass. The recirculated air is compressed by the ES compressor and thereby warmed before passing through the CAC. An increase in air temperature in the CAC causes ice formed in channels of the CAC to melt, which may be removed from the CAC by collection in a collecting vessel coupled to the CAC.

At 216 it may be determined if the air temperature measured by the bypass temperature sensor is equal to or higher than a maximum temperature threshold. The maximum temperature threshold may be based on a temperature that air flowing through the CAC is sufficiently warm to fully defrost the CAC but not warm enough to evaporate the condensate. In one example, the maximum temperature threshold may be 15° C. The maximum temperature threshold may vary, however, based on an amount of ice formed in the CAC. The amount of ice formed may be based on, for example, a detected pressure differential between an inlet and an outlet of the CAC. More ice accumulation within the CAC results in a greater pressure drop across the CAC and a greater pressure differential may result in an increase in the maximum temperature threshold to accommodate larger amounts of ice.

If the temperature in the bypass is detected to be below the maximum threshold, the method returns to 210 to continue recirculating boosted air through the active ES and CAC with at least one valve of each cylinder, the CRV, and the EGR valve closed. If the temperature is detected to be at or above the maximum threshold, the method proceeds to 218 to deactivate the ES and close the bypass valve, terminating recirculation of intake air.

An example map 300 is shown in FIG. 3 for de-icing a charge-air compressor (CAC) of a compound boosted engine of a hybrid elective vehicle when the vehicle is shutdown or in an electric vehicle (EV) mode. The hybrid electric vehicle may have a system battery that has sufficient charge to operate a supercharger while the vehicle is shutdown or idling in the EV mode. At least one of an exhaust valve of an intake valve of each cylinder of the engine is adjusted to be closed when the vehicle enters the shutdown or EV mode. Map 300 depicts an engine activation at plot 302, an air temperature in a bypass passage that recirculates boosted air from downstream of the CAC to stream of an electric compressor at plot 304, and a position of a shutdown element (e.g., bypass valve) arranged in the bypass passage at plot 306. Activation of an electric motor driving an electric supercharger (ES), positioned downstream of a turbocharger and upstream of the CAC, is shown at plot 308. Positioning of an EGR valve is shown at plot 310 and a position of a compressor recirculation valve (CRV) is shown at plot 312. All plots are shown over time, along the x-axis. Thresholds are indicated by dashed horizontal lines. For example, plot 304 includes a minimum temperature threshold 303 that determines when ice may form in the CAC and a maximum temperature threshold 305 that represents a temperature at which ice is thawed and condensate expelled from the CAC.

Prior to t1, the engine is on, the EGR valve is open, allowing exhaust gas to be recirculated to an intake manifold of the engine, and the CRV is partially open to avoid compressor surge. The air temperature in the bypass passage is low, below the minimum threshold, indicating that ambient temperature, e.g., temperature outside of the vehicle, is low. The bypass valve is closed and the ES motor is off.

At t1, the engine is turned off and, as a result of deactivating the engine, the EGR valve is closed. The EGR valve may be set to automatically close when the engine is off to avoid having the EGR valve open when the engine is turned back on which may delay generation of a pressure differential between an exhaust manifold and the intake manifold that drives EGR flow. Due to the air temperature of the bypass passage being below the minimum threshold, the bypass valve is opened and the ES motor activated to recirculate, compress, and warm the air flowing through the CAC. The CRV is closed to prevent loss of air.

Between t1 and t2 the air temperature in the bypass passage gradually warms until, at t2, the temperature reaches the maximum temperature threshold. Upon the bypass passage air temperature reaching the maximum temperature threshold, the bypass valve is closed and the ES motor turned off.

In this way, a hybrid electric engine system may have at least one electrically driveable compressor to be configured as a supercharged engine. Charge air may be cooled by the CAC, provided in an intake system of the engine, before entering at least one cylinder of the engine. The cooling contributes to improved charging, e.g., improved charging efficiency but during cold ambient conditions, ice may accumulate in the CAC when the engine is turned off, thereby degrading performance of the CAC. By configuring the engine system with a bypass line and a controllable valve, air may be recirculated through the bypass line when the engine is turned off, the electric supercharger activated, and the bypass valve open. As the air is recirculated from downstream of the CAC to upstream of the supercharger compressor, compression warms the air, allowing the warmed air to flow through the CAC and melt accumulated ice. The technical effect of providing a recirculation path around the electric supercharger and CAC is that ice accumulation in the CAC is prevented when the vehicle is idling in an EV mode or turned off.

FIG. 1 shows example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/ below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/ lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In one embodiment, a supercharged internal combustion engine includes at least one cylinder head comprising at least one cylinder, in which each cylinder has at least one inlet opening which is adjoined by an intake line for the supply of air via an intake system and each cylinder has at least one outlet opening which is adjoined by an exhaust line for the discharge of the exhaust gases via an exhaust-gas discharge system and a charge-air cooler is provided in the intake system and an electrically driveable compressor is arranged in the intake system, the electrically driveable compressor being the compressor of an electric supercharger and wherein a bypass line is provided, which branches off from the intake system, so as to form a first junction point, downstream of the electrically driveable compressor and downstream of the charge-air cooler and opens into the intake system, so as to form a second junction point, upstream of the electrically driveable compressor and upstream of the charge-air cooler. In a first example of the engine, the bypass line is equipped with a shut-off element. A second example of the engine optionally includes the first example, and further includes wherein a sensor is arranged in the bypass line and detects, by measurement, a temperature of the air conveyed via the bypass line. A third example of the engine optionally includes one or more of the first and second examples, and further includes, wherein the bypass line is provided for bypassing the electrically driveable compressor. A fourth example of the engine optionally includes one or more of the first through third examples, and further includes, wherein at least one exhaust gas turbocharger is provided with a turbine arranged in the exhaust-gas discharge system and a compressor arranged in the intake system and the electrically driveable compressor is arranged in the intake system downstream of the compressor of the exhaust-gas turbocharger, and wherein the bypass line opens into the intake system, so as to form the second junction point, between the electrically driveable compressor and the compressor of the exhaust gas turbocharger. A fifth example of the engine optionally includes one or more of the first through fourth examples, and further includes, wherein the charge-air cooler is provided in the intake system downstream of the electrically driveable compressor and the charge-air cooler is configured to be self-draining and inclined so that an inlet into the charge-air cooler is arranged geodetically higher than an outlet from the charge-air cooler and wherein a collecting vessel for receiving condensate from the charge-air cooler is arranged in the intake system downstream of the charge-air cooler and upstream of the first junction point. A sixth example of the engine optionally includes one or more of the first through fifth examples, and further includes, wherein the electrically driveable compressor is configured to be smaller than the compressor of the at least one exhaust-gas turbocharger.

In another embodiment, a method includes operating an electric supercharger arranged downstream of an exhaust gas turbocharger in an intake system during engine operation and shutting-down the engine and thereafter operating the electric supercharger to heat intake air and circulate the air through a charge-air cooler to counteract ice formation therein. In a first example, the method includes wherein the electric supercharger is powered by a system battery and operation of the electric supercharger during shut-down of the engine occurs when the battery is charged at least to a minimum threshold of battery charge and a vehicle in which the engine is positioned is driven exclusively on electric power as it travels. A second example of the method optionally includes the first example, and further includes, wherein a bypass line in the air intake has a first junction that branches off an intake system of the engine downstream of the charge-air cooler and a second junction branching off the intake system upstream of an electrically driveable compressor of the supercharger and downstream of an exhaust gas turbocharger compressor so that air is recirculated through the electrically driveable compressor and the charge-air cooler concurrently via the operation of the electric supercharger during shut-down engine conditions. A third example of the method optionally includes one or more of the first and second examples, and further includes, wherein the bypass line is equipped with a shut-off element that, by virtue of the shut-off element being opened, activates the electrically driveable compressor when the internal combustion engine is in a shut-down state. A fourth example of the method optionally includes one or more of the first through third examples, and further includes, wherein a sensor for detecting, by measurement, a temperature of the air conveyed by the bypass line is provided in the bypass line and the temperature of the conveyed air is controlled using the electrically driveable compressor and/or the sensor and/or the shut-off element such that frozen water melts, but liquid water does not evaporate. A fifth example of the method optionally includes one or more of the first through fourth examples, and further includes, wherein a shut-off element and a sensor for detecting a temperature of the air conveyed by the bypass line are both arranged in the bypass line and the sensor actuates the opening of the shut-off element when the temperature of the air falls below a minimum temperature threshold. A sixth example of the method optionally includes one or more of the first through fifth examples, and further includes, wherein opening of the shut-off element activates the electrically driveable compressor while actuating a closing of an EGR valve of the supercharged internal combustion engine and a closing of a compressor recirculation valve of an exhaust gas turbocharger. A seventh example of the method optionally includes one or more of the first through sixth examples, and further includes, wherein activation of the electrically driveable compressor circulates air through the bypass line, and wherein air is compressed and warmed by the electrically driveable compressor. An eighth example of the method optionally includes one or more of the first through seventh examples, and further includes, wherein air warmed by circulation through the electrically driveable compressor warms the charge-air cooler and melts ice formed in the charge-air cooler. An ninth example of the method optionally includes one or more of the first through eighth examples, and further includes, wherein ice melted by warming of the charge-air cooler is removed from the charge-air cooler by collection in a collecting vessel coupled to the charge-air cooler. A tenth example of the method optionally includes one or more of the first through ninth examples, and further includes, wherein air warmed by circulation through the electrically driveable compressor warms the charge-air cooler and prevents ice formation in the charge-air cooler. An eleventh example of the method optionally includes one or more of the first through tenth examples, and further includes, wherein the sensor measuring temperature of air conveyed by the bypass line actuates a closing of the shut-off element when the temperature of the air reaches a maximum temperature threshold. A twelfth example of the method optionally includes one or more of the first through eleventh examples, and further includes, wherein the closing of the shut-off element in the bypass line deactivates the electrically driveable compressor.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an engine comprising;
operating an electric supercharger arranged downstream of an exhaust gas turbocharger in an intake system during engine operation; and
shutting-down the engine and thereafter operating the electric supercharger to heat intake air and circulate the air through a charge-air cooler to counteract ice formation therein; and
wherein the electric supercharger is powered by a system battery and the electric supercharger operates during shut-down of the engine when the battery is charged at least to a minimum threshold of battery charge, the minimum threshold of battery charge providing sufficient power to drive a vehicle exclusively on electric power as the vehicle travels.

2. The method of claim 1, wherein a bypass line in the intake system has a first junction that branches off the intake system of the engine downstream of the charge-air cooler and a second junction branching off the intake system upstream of an electrically driveable compressor of the electric supercharger and downstream of an exhaust gas turbocharger compressor so that air is recirculated through the electrically driveable compressor and the charge-air cooler concurrently via operation of the electric supercharger during shut-down engine conditions.

3. The method of claim 2, wherein operating the electric supercharger includes, responsive to a temperature of the air conveyed by the bypass line falling below a threshold, opening a shut-off element of the bypass line, and activating the electrically driveable compressor of the electric supercharger when the engine is in a shut-down state.

4. The method of claim 3, wherein a sensor for detecting, by measurement, the temperature of the air conveyed by the bypass line is provided in the bypass line and the temperature of the conveyed air is controlled using the electrically driveable compressor and/or the sensor and/or the shut-off element such that frozen water melts, but liquid water does not evaporate.

5. The method of claim 4, wherein responsive to opening of the shut-off element, activating, the electrically driveable compressor while closing an EGR valve of the engine and closing a compressor recirculation valve of the exhaust gas turbocharger.

6. The method of claim 5, wherein air is circulated through the bypass line when the electrically driveable compressor is activated, and wherein air is compressed and warmed by the electrically driveable compressor.

7. The method of claim 6, wherein air warmed by circulation through the electrically driveable compressor warms the charge-air cooler and melts ice formed in the charge-air cooler.

8. The method of claim 7, wherein ice melted by warming of the charge-air cooler is removed from the charge-air cooler by collection in a collecting vessel coupled to the charge-air cooler.

9. The method of claim 6, wherein air warmed by circulation through the electrically driveable compressor warms the charge-air cooler and prevents ice formation in the charge-air cooler.

10. The method of claim 4, wherein responsive to the sensor measuring the temperature of air conveyed by the bypass line at or above a maximum temperature threshold, closing the shut-off element.

11. The method of claim 10, further comprising deactivating the electrically driveable compressor in response to closing the shut-off element in the bypass line.

12. An engine system, comprising:
an electric supercharger with an electrically driveable compressor, the electrically driveable compressor arranged in an intake system; and
a bypass line branching off from the intake system to form a first junction point, downstream of the electrically driveable compressor and downstream of a charge-air cooler and a second junction point, upstream of the electrically driveable compressor, and upstream of the charge-air cooler; and
a system battery; and
a controller including executable instructions stored on a non-transitory memory to:
operate the electric supercharger to flow air from the first junction point to the second junction point to counteract ice formation in the charge-air cooler when the electrically driveable supercharger is powered by the system battery, the engine system is in a shut-down state, and the battery is charged to at least a minimum charge threshold sufficient to power motion of a vehicle and operate the electrically driveable compressor.

13. The engine system of claim 12, wherein the air flowed from the first junction point to the second junction point is compressed and heated more than once.

14. The engine system of claim 12, wherein the vehicle is a hybrid vehicle that includes the engine system.

15. The engine system of claim 12, wherein the bypass line includes a bypass valve that controls flow of air through the bypass line and wherein the bypass valve is adjustable between a fully open position and a closed position.

16. The engine system of claim 12, wherein the controller is configured to maintain a temperature of air in the bypass line below a temperature threshold during the step of operating the electric supercharger, the temperature threshold being a temperature above which water becomes vapor.

17. The engine system of claim 16, wherein a sensor is positioned in the bypass line, the sensor configured to measure a temperature in the bypass line.

* * * * *